Inventors
Ronald O.C. Gadd
Alan A.V. Judge
By their Attorney

3,009,616
APPARATUS FOR TRIMMING FLASH
Ronald Owen Caswell Gadd and Alan Alfred Victor Judge, Leicester, England, assignors to United Shoe Machinery Corporation, Flemington, N.J., and Boston, Mass., a corporation of New Jersey
Filed Dec. 10, 1957, Ser. No. 701,793
Claims priority, application Great Britain Dec. 17, 1956
9 Claims. (Cl. 225—93)

This invention relates to trimming and particularly to apparatus for trimming articles having thin peripheral flash. At the present time, many articles of rubber and similar materials are formed by molding, and it is a common characteristic for such articles to be formed with a comparatively thin peripheral flash caused by incomplete contact of adjacent portions of their molds. It is usually required that this flash be removed by trimming or other means before the articles are marketed, frequently such trimming being done by hand, using a scissors. This method obviously is time consuming and expensive and, therefore, various machines have been proposed for performing this trimming operation. However, difficulty is frequently encountered with machines because the flash is extremely thin and flexible and consequently not readily supported. A further difficulty arises in designing a trimming machine in which adequate flash supporting mechanism can be located sufficiently close to the trimming instrumentality to be effective. Additional difficulties arise when the contour of the article to be trimmed is concave, it being difficult then to maneuver or feed the article to the trimming instrumentality.

It is accordingly an object of the present invention to provide an improved machine for trimming articles having thin flexible flash.

It is another object of this invention to provide a machine for adequately trimming articles having thin flexible flash when the contours of said articles are concave.

It is still another object of this invention to provide a machine for trimming thin flexible flash from molded articles and the like in which the article and the flash are supported and guided during the trimming operation in such manner as to require a minimum amount of effort on the part of an operator while obtaining optimum results.

In accordance with these objects, applicants have found that thin flexible flash formed on articles of molded rubber and the like may be effectively trimmed from the articles by presenting the article to a trimming locality which is defined as the point at which a rapidly moving surface, a convex stress applying edge bounding said surface, and an edge of an end face of a supporting member urged against said surface, meet, and moving the article relative to said locality so that the point of trim moves along the required contour of the article and wherein the instantaneous direction of movement of the point of trim at the trimming locality has a greater component perpendicular to the plane containing the direction of movement of the engaging surface at the trimming locality and a line in said surface at said locality than it has in said plane.

In order to carry out the above described procedure there is provided a machine for use in trimming flash, such as molded articles and the like, which comprises a trimming member having a flash engaging surface and a narrow convex stress applying edge bounding said surface, a supporting member having an end face urged against said surface adjacent said stress applying edge and means for causing rapid movement of said surface and said stress applying edge past the end face of the supporting member. In the machine the said flash engaging surface comprises a planar surface on a rotatable disk. The narrow convex stress applying edge is formed on the periphery of said disk and the supporting member comprises a rod having at least one flat surface and an end face contiguous with said surface urged against said planar surface. An edge of the end face of the rod, i.e. the intersection between the flat surface and said end face, extends along said surface and past the stress applying edge whereby in the operation of said machine the flash of an article to be trimmed engages said planar surface and said supporting member or rod and the stress applying edge is caused to contact the article and the flash at the point of trim.

For guiding and directing the article and its flash to the trimming locality there are provided a plurality of guiding and directing members including a work piece and flash support located in close proximity to and cooperating with the edge of the end face of the rod; a support cooperating with the work piece and flash support which is adjustable in accordance with the configuration of the article being trimmed and a gage member which is engageable with the work piece close to the point of trim which is adjustable relative to the trimming instrumentality and the supporting instrumentalities to accommodate various thicknesses of flash.

The above and other features of the invention including various novel details of construction and combinations of parts will now be more particularly described with reference to the accompanying drawings and pointed out in the claims.

Figure 1:
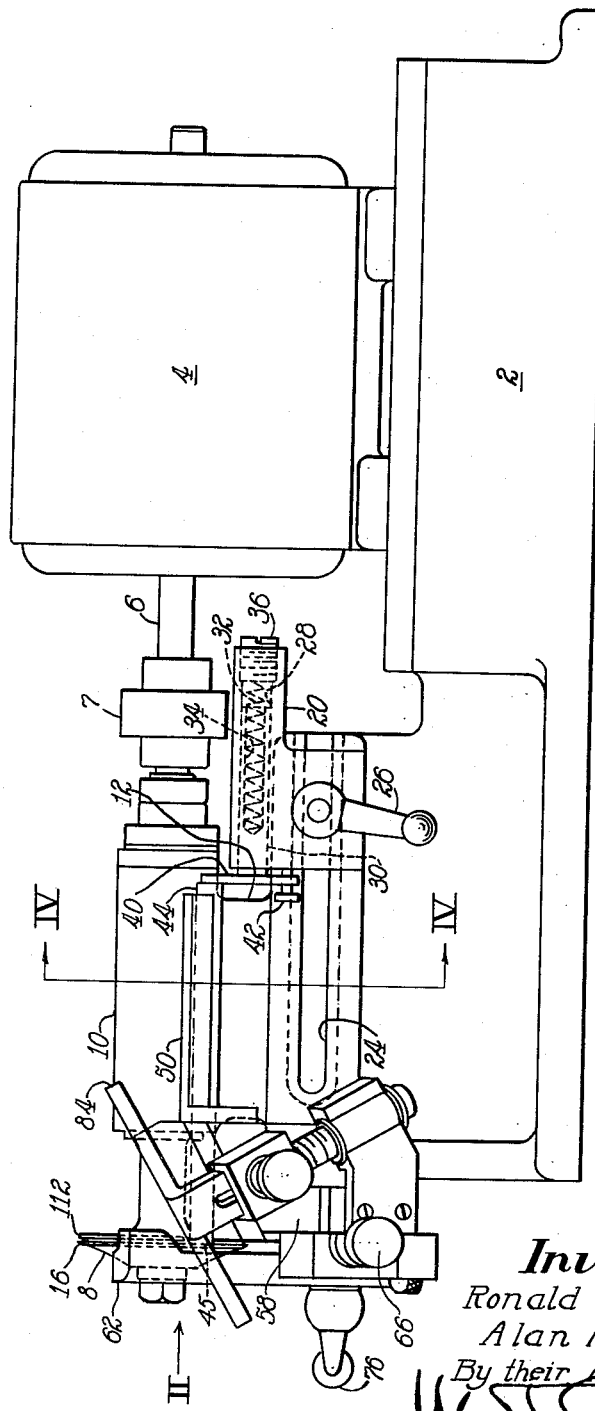
FIG. 1 is a side elevation of one form of trimming machine in which the invention is embodied and by which the method may be practiced.

The general organization of the illustrative machine is best seen in FIG. 1. It comprises a base 2 which supports a motor 4 from which extends a shaft 6. The shaft 6 is connected through a coupling 7 to a shaft carrying at its outer end a disk 8, the shaft being journaled in a bearing 10 on a bracket 12 (FIG. 4) extending from the base 2. The disk 8 includes, see FIG. 5, a vertical planar surface 14 bounded by a narrow convex peripheral stress applying edge 16.

Figure 4:
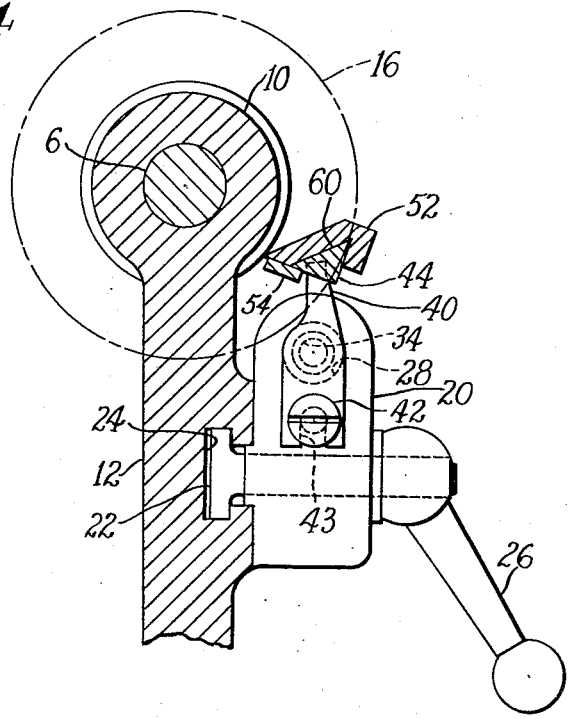
FIG. 4 is a sectional view taken along the line IV—IV on FIG. 1.

Slidable horizontally and parallel to the shaft 6 is a housing 20, best seen in FIG. 4, which is mounted on the bracket 12 by a slide 22 movable within a guideway 24 in the bracket 12. The slide 22 and hence the housing 20 may be locked in position on the bracket 12 by a clamping lever 26 in a conventional manner. Slidably mounted in a bore 28 in the housing 20 is a rod or bar 30 (FIG. 1). A spring 32 is compressed between the end of a bore 34 in the rod 30 and a screw 36 threaded in the right-hand end of the housing 20. The spring urges the rod 30 to the left as viewed in FIG. 1. The rod 30 extends out of the bore 28 and attached thereto is a plate 40. The rod 30 and the plate 40 are prevented from rotating relative to the housing 20 by a screw 42 threaded in the housing and engaging a slot 43 (FIG. 4) in the lower end of the plate 40.

Figure 3:
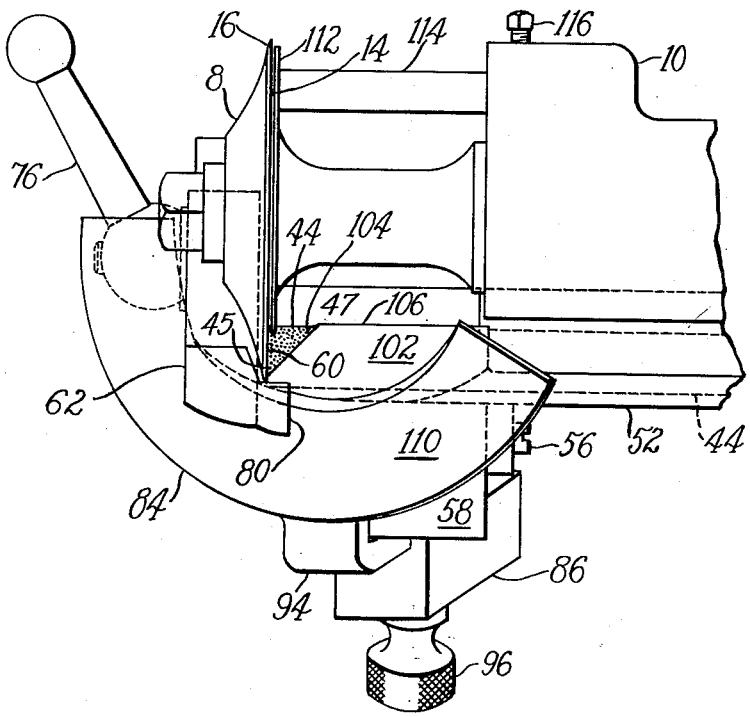
FIG. 3 is a plan view of the work supporting and trimming portion of the machine.

The plate 40 applies pressure to the right-hand face of a rod 44 also known as the flash supporting member which extends lengthwise of the machine toward the disk 8, its left-hand face 45 pressing against the vertical planar surface 14 of the disk 8. The rod 44, which is a hard wear-resistant laminated plastic is slidable in a support 50 (FIG. 1) comprising a channel member 52 and a flange 54 (FIG. 4). The rod 44 has at least one flat flash supporting surface 47 contiguous with the left-hand face 45. The rod 44 is herein shown as triangular in cross section and slides between the members 52 and 54 which are secured by screws 56 to a block 58 (FIG. 3) attached to the machine frame. Adjustment of the position of the housing 20 relative to the guideway 24 determines the force with which the left-hand face 45 of the rod 44 bears against the surface 14 of the disk 8. The function of the rod 44 will be explained in more detail hereinafter.

The top edge 60 which is the intersection of the left-hand face 45 of the rod 44 and the flash supporting surface 47 extends along the surface 14 of the disk 8 and outwardly beyond the peripheral edge 16 by about 1/64 of an inch. In cross section the rod 44 is substantially an isosceles right triangle with the edge 60 constituting the hypotenuse. The point where the surface 14 of the disk, the edge 60 of the rod 44 and the peripheral edge 16 of the disk meet constitutes the trimming locality.

Figure 2:
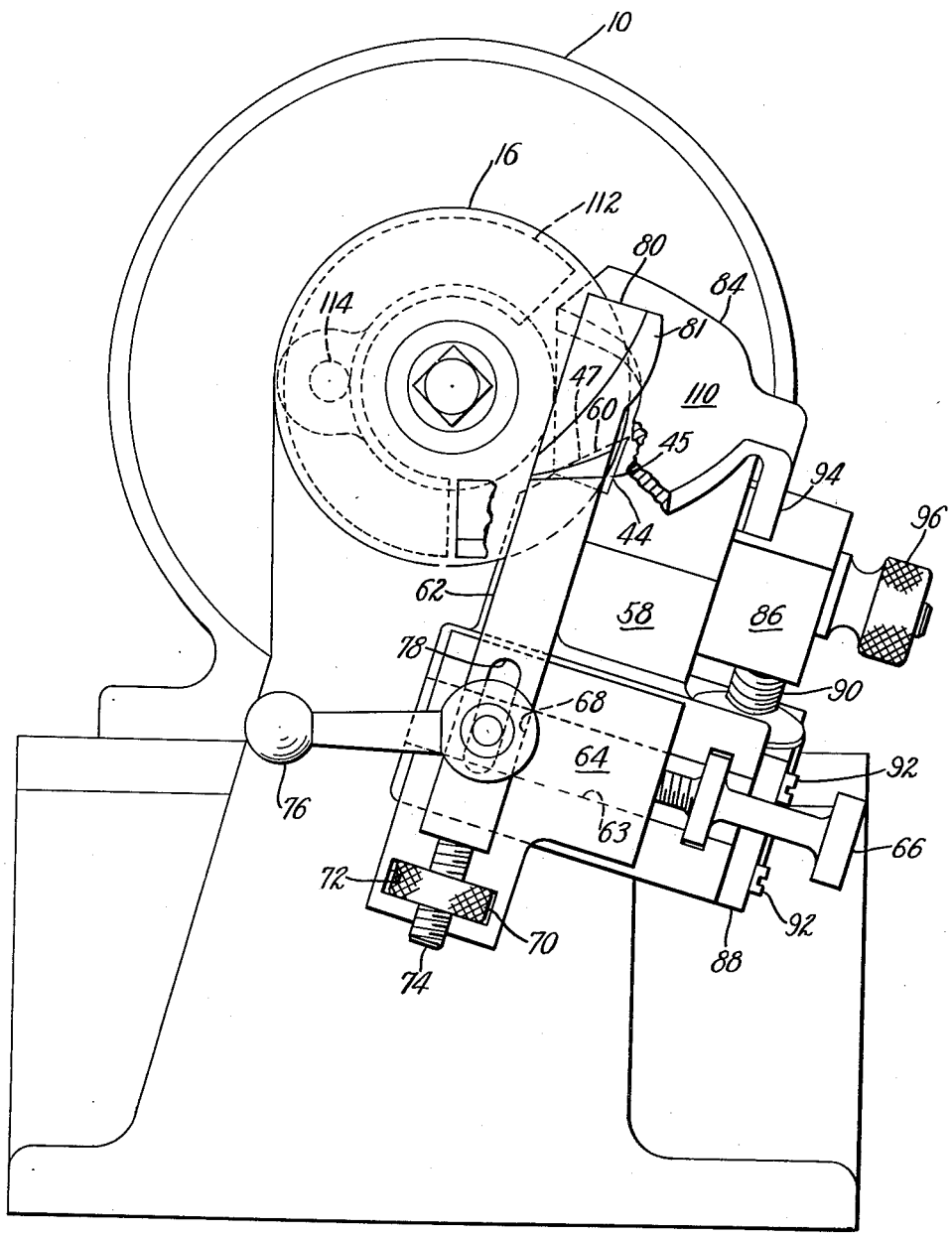
FIG. 2 is an end elevation of the machine taken in the direction of the arrow in FIG. 1.
Figure 6:
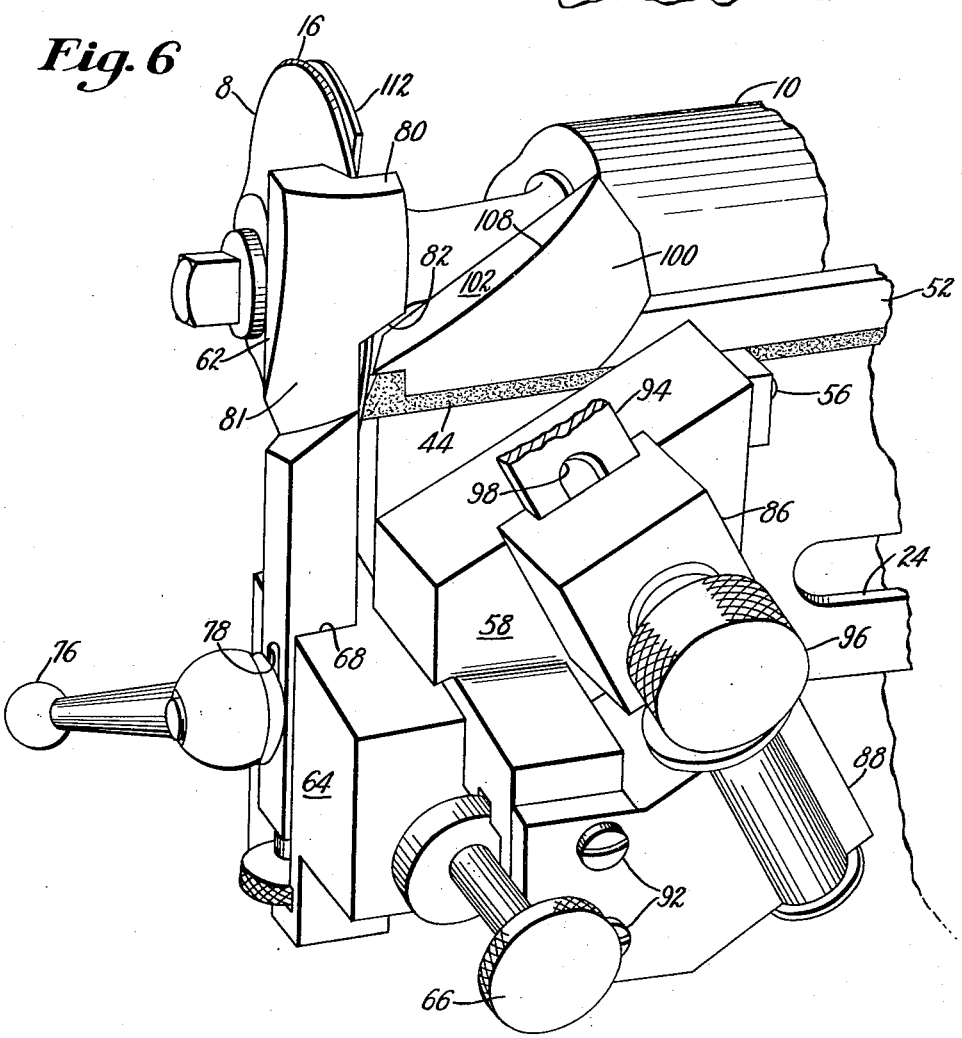
FIG. 6 is a perspective view of the portions of the machine shown in FIGS. 2 and 3 with parts broken away.

A work guide 62 is adjustably mounted adjacent the disk 8 by the following mechanism. The aforementioned block 58 mounts a second block 64 for sliding movement along a guideway 63 (FIG. 2), its position relative to the block 58 being adjusted by means of a screw 66 rotatably mounted therein. The guide 62 is slidable in a guideway 68 formed in the block 64 which is normal to the guideway 63 in the block 58. The position of the guide 62 relative to the block 64 is adjusted by rotation of a nut 70 engageable with a slot 72 in the block 64 and threaded on a rod 74 attached to the work guide 62. A locking bolt 76 passing through a slot 78 in the guide 62 locks the blocks 64, 58 and the guide 62 together when the guide 62 is in the desired position of adjustment as will be described hereinafter. The guide 62 includes a flange portion 80 adjacent the circumference of the disk 8. It is of irregular configuration having a first or outer curved portion 81 engageable with the article being trimmed and a sloping second or under surface 82 (FIG. 6).

A guide plate 84 is also adjustably mounted adjacent the disk 8 by the following mechanism. A block 86 is adjustably secured to a bracket 88 by a threaded rod 90. The bracket 88 is secured by screws 92 to the block 58. Slidably passing through the block 86 is an arm 94 extending downwardly from the guide plate 84. The position of the guide plate 84 is maintained in heightwise adjustment by a locking screw and slot connection 96, 98 (FIG. 6) in the block 86 and the arm 94, respectively.

A work support 100 is attached to the upper surface of the channel member 52 in which the rod 44 slides. The support 100 has an upper inclined plane surface 102 substantially parallel with the surface 82 of the guide 62. The surface 102 is bounded by two straight sides 104, 106 (FIG. 3) and a curved side 108 (FIG. 6). It will be noted that the rod 44 passes between the block 58 and the work support 100 which are formed so that the rod 44 is supported slidably between them. The upper surface 110 of the guide plate 84 is parallel with the upper surface 102 of the work support 100. However, depending upon the size and shape of the article to be trimmed the guide plate 84 is elevated or depressed so that its surface 110 is above, below or co-planar with the surface 102.

An arcuate guard 112 which lies close to the surface 14 of the disk 8 extends part way around the circumference of the disk 8, being mounted on a rod 114 secured in the bearing 10 by a screw 116. It prevents inadvertent contact with the rotating disk 8.

The illustrative machine is operated in the following manner. The guide plate 84 is elevated or depressed relative to the surface 102 of the work support 100 in accordance with the size and shape of the particular article being trimmed. The guide 62 is adjusted relative to the disk 8 and the other guiding and supporting members by the screw 66 and the nut 70. Heightwise adjustment of the guide 62 permits the operator to vary the gap between the surfaces 82 and 102 in accordance with the thickness of the flash. This is to assure that the flash can pass between the surface 102 of the work support 100 and the undersurface 82 of the flange portion 80 of the guide 62 with the work piece W engaging the guide 62 as it is being trimmed, as seen in FIG. 5.

The position of the housing 20 relative to the disk 8 is adjusted in order that the left-hand face 45 of the rod or flash supporting member 44 bears against the planar surface 14 of the disk 8 with a force of about 4 lbs. The top edge 60 of the rod 44 extends along the surface 14 and outwardly, i.e. to the right as seen in FIG. 4, beyond the stress applying edge 16 of the disk 8 by about 1/64 of an inch.

The point where the stress applying edge 16 of the disk 8, the upper edge 60 of the rod 44 and the planar surface 14 intersect is the trimming locality. The disk 8 is rotated in a clockwise direction, as seen in FIG. 4, at a high rate of speed. The reason that the edge 60 of the rod 44 extends beyond the stress applying edge 16 of the disk is to provide support for the flash at the trimming locality. The rod bears against the surface 14 with pressure to prevent the flash from being dragged downwardly by the disk as it is being trimmed. It has been found advantageous to construct the rod 44 of hard wear-resistant laminated plastic which has self-lubricating properties since, as stated above, it is necessary for the rod to bear against the rotating disk. The use of lubricants is disadvantageous in this area due to the proximity of the work pieces.

Figure 5:
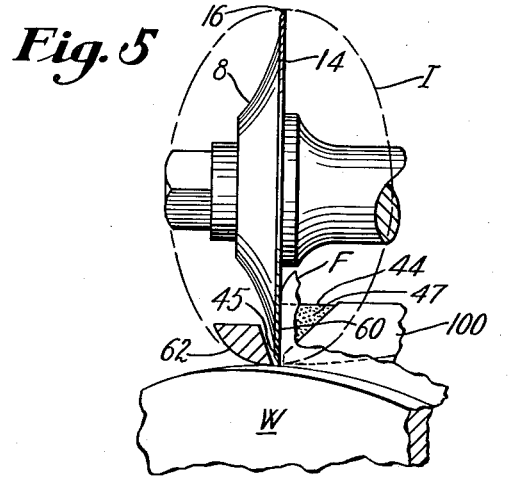
FIG. 5 is a diagrammatic plan view of the work supporting and trimming portion of the machine with a work piece in the process of being trimmed.

A work piece having a thin peripheral flash, as seen in FIG. 5, is presented to the trimming locality with the flash guided by the surface 102 of the work support 100 and the edge 60 of the rod 44 with the marginal edge of the work piece in engagement with the surface 81 of the guide 62. The surface 110 of the guide plate 84 assists the work support 100 in guiding the work piece. The work piece is then moved toward the disk 8 so that the direction of movement of the point of trim, said point being the point at which the flash is instantaneously being severed from the work, lies in a plane which is normal to the surface 14 of the disk and parallel to the surface 102 of the work support 100.

By the arrangement of the various work engaging and guiding members relative to the disk 8, optimum trimming conditions are obtained, which, although they may vary according to the article being trimmed, occur when the flash engages the surface 14 of the disk 8 and the direction of movement of the point of trim has a greater component perpendicular to the plane containing the direction of movement of the surface 14 at the trimming locality and a line in said surface 14 at said trimming locality than it has in said plane. In other words, the optimum condition of trimming exists when the point of trim moves more nearly at right angles to the surface 14 than parallel with the surface 14. Applicants believe that the flash is not so much cut at the point of trim as torn by the combined stress applied by the stress applying edge 16 of the disk 8 and the pulling of the flash by the moving surface 14, the rod 44 serving to support the flash so that these stresses are effectively applied. The stress applying edge 16 need not be sharp in the usual sense of the word and does not effectively trim flash presented to it in the manner that material is presented to a rotary-knife slicer having a sharp edge.

This apparatus has been found particularly effective in the trimming of inside or concave curves, for example, a curve having a contour I, as seen in FIG. 5 (a circular contour inclined in the plane of the surface 102).

Having thus described our invention, what we claim as new and desire to secure by Letters Patent of the United States is:

1. A machine for trimming flash from molded articles and the like comprising a member having a flash engaging surface and a stress applying edge bounding said surface, a flash supporting member having an end face in engagement with said surface adjacent said edge, the flash engaging surface comprising a planar surface on a rotatable disk, the stress applying edge being formed as a convex periphery of said disk and the flash supporting member comprising a rod having an end face in engagement with said planar surface, means for urging the end face of said rod against said planar surface with a variable amount of force, and means for causing rapid rotation of said disk about a fixed axis whereby said planar surface and said stress applying edge move past said end face to sever said flash.

2. A machine for trimming flash from molded articles and the like comprising a member having a flash engaging surface and a stress applying edge bounding said surface, a flash supporting member having an end face in engagement with said surface adjacent said edge, the flash engaging surface comprising a planar surface on a rotatable disk, the stress applying edge being formed as a convex periphery of said disk and the flash supporting member comprising a rod having an end face in engagement with said planar surface, a guide for slidably supporting said rod, spring means for urging said rod against said planar surface, and means for causing rapid rotation of said disk about a fixed axis whereby said planar surface and said stress applying edge move past said end face to sever said flash.

3. A machine for trimming flash from molded articles and the like comprising a member having a flash engaging surface and a stress applying edge bounding said surface, a flash supporting member having an end face in engagement with said surface adjacent said edge, the flash engaging surface comprising a planar surface on a rotatable disk, the stress applying edge being formed as a convex periphery of said disk and the flash supporting member comprising a rod having an end face in engagement with said planar surface, a work support having a work engaging surface inclined toward said planar surface and terminating adjacent the end face of said rod, and means for causing rapid rotation of said disk about a fixed axis whereby said planar surface and said stress applying edge move past said end face to sever said flash.

4. A machine for trimming flash from molded articles and the like comprising a member having a flash engaging surface and a stress applying edge bounding said surface, a flash supporting member having an end face in engagement with said surface adjacent said edge, the flash engaging surface comprising a planar surface on a rotatable disk, the stress applying edge being formed as a convex periphery of said disk and the flash supporting member comprising a rod having an end face in engagement with said planar surface, a work engaging guide adjacent said stress applying edge, and means for causing rapid rotation of said disk about a fixed axis whereby said planar surface and said stress applying edge move past said end face to sever said flash.

5. A machine for trimming flash from molded articles and the like comprising a member having a flash engaging surface and a stress applying edge bounding said surface, a flash supporting member having an end face in engagement with said surface adjacent said edge, the flash engaging surface comprising a planar surface on a rotatable disk, the stress applying edge being formed as a convex periphery of said disk and the flash supporting member comprising a rod having an end face in engagement with said planar surface, a work support having a work engaging surface inclined toward said planar surface and terminating adjacent the end face of said rod, a work engaging guide adjacent said stress applying edge, and means for causing rapid rotation of said disk about a fixed axis whereby said planar surface and said stress applying edge move past said end face to sever said flash.

6. A machine for trimming flash from molded articles and the like comprising a member having a flash engaging surface and a stress applying edge bounding said surface, a flash supporting member having an end face in engagement with said surface adjacent said edge, the flash engaging surface comprising a planar surface on a rotatable disk, the stress applying edge being formed as a convex periphery of said disk and the flash supporting member comprising a rod having an end face in engagement with said planar surface, a work support having a work engaging surface inclined toward said planar surface and terminating adjacent the end face of said rod, a guide having a curved surface engageable with the work piece being trimmed and a second surface substantially parallel to said work support, and means for causing rapid rotation of said disk about a fixed axis whereby said planar surface and said stress applying edge move past said end face to sever said flash.

7. A machine for trimming flash from molded articles and the like comprising a member having a flash engaging surface and a stress applying edge bounding said surface, a flash supporting member having an end face in engagement with said surface adjacent said edge, the flash engaging surface comprising a planar surface on a rotatable disk, the stress applying edge being formed as a convex periphery of said disk and the flash supporting member comprising a rod having an end face in engagement with said planar surface, a work support having a work engaging surface inclined toward said planar surface and terminating adjacent the end face of said rod, a work guide adjacent said stress applying edge, means for adjusting said guide toward and away from said disk and said work support, and means for causing rapid rotation of said disk about a fixed axis whereby said planar surface and said stress applying edge move past said end face to sever said flash.

8. A machine for trimming flash from molded articles and the like comprising a member having a flash engaging surface and a stress applying edge bounding said surface, a flash supporting member having an end face in engagement with said surface edjacent said edge, the flash engaging surface comprising a planar surface on a rotatable disk, the stress applying edge being formed as a convex periphery of said disk and the flask supporting member comprising a rod having an end face in engagement with said planar surface, a work support having a work engaging surface inclined toward said planar surface and terminating adjacent the end face of said rod, a guide plate having a work engaging surface parallel with the work engaging surface of the work support, and means for causing rapid rotation of said disk about a fixed axis whereby said planar surface and said stress applying edge move past said end face to sever said flash.

9. A machine for trimming flash from molded articles and the like comprising a member having a flash engaging surface and a stress applying edge bounding said surface, a flash supporting member having an end face in engagement with said surface adjacent said edge, the flash engaging surface comprising a planar surface on a rotatable disk, the stress applying edge being formed as a convex periphery of said disk and the flash supporting member comprising a rod having an end face in engagement with said planar surface, a work support having a work engaging surface inclined toward said planar surface and terminating adjacent the end face of said rod, a guide plate having a work engaging surface parallel with the work engaging surface of the work support, means for adjusting said guide plate relative to said work support into and out of co-planar relationship therewith, and means for causing rapid rotation of said disk about a fixed axis whereby said planar surface and said stress applying edge move past said end face to sever said flash.

References Cited in the file of this patent

UNITED STATES PATENTS

| | | |
|---|---|---|
| 1,376,018 | Kane | Apr. 26, 1921 |
| 1,534,053 | Brogan | Apr. 21, 1925 |
| 1,534,257 | Brogan | Apr. 21, 1925 |
| 2,090,585 | Waechter | Aug. 17, 1937 |
| 2,148,379 | McFarland et al. | Feb. 21, 1939 |
| 2,439,794 | Bugatt | Apr. 20, 1948 |
| 2,499,681 | Price | Mar. 7, 1950 |
| 2,835,326 | Hayhurst et al. | May 20, 1958 |
| 2,846,005 | Wilson | Aug. 5, 1958 |